United States Patent
Zang et al.

(10) Patent No.: US 9,235,865 B1
(45) Date of Patent: Jan. 12, 2016

(54) IDENTIFYING INFLUENCERS USING SOCIAL INFORMATION

(71) Applicant: SPRINT COMMUNICATIONS COMPANY, L.P., Overland Park, KS (US)

(72) Inventors: Hui Zang, Cupertino, CA (US); Yi Wang, Belmont, CA (US); Phyllis Reuther

(73) Assignee: Sprint Communications Company L.P., Overland Park, KS (US)

(*) Notice: Subject to any disclaimer, the term of this patent is extended or adjusted under 35 U.S.C. 154(b) by 458 days.

(21) Appl. No.: 13/661,211

(22) Filed: Oct. 26, 2012

(51) Int. Cl.
*G06F 15/16* (2006.01)
*G06Q 50/00* (2012.01)
*G06Q 30/02* (2012.01)
*H04L 29/08* (2006.01)
*G06Q 30/06* (2012.01)

(52) U.S. Cl.
CPC ............ *G06Q 50/01* (2013.01); *G06Q 30/0255* (2013.01); *G06Q 30/0201* (2013.01); *G06Q 30/0251* (2013.01); *G06Q 30/0631* (2013.01); *H04L 67/22* (2013.01)

(58) Field of Classification Search
CPC .............. G06Q 50/01; G06Q 30/0251; G06Q 30/0255; G06Q 30/0201; G06Q 30/0631; H04L 67/22; H04L 51/32; H04L 43/045; H04L 51/063; H04L 67/1044
USPC ......................................................... 709/206
See application file for complete search history.

(56) References Cited

U.S. PATENT DOCUMENTS

| | | | |
|---|---|---|---|
| 2006/0042483 A1* | 3/2006 | Work et al. ..................... | 101/91 |
| 2012/0109737 A1* | 5/2012 | Setty et al. .................. | 705/14.41 |
| 2012/0166530 A1* | 6/2012 | Tseng ........................... | 709/204 |

* cited by examiner

*Primary Examiner* — Edward Kim

(57) ABSTRACT

A method, system, and medium are provided for using social information to determine influencers amongst a group of subscribers subscribing to services offered by a wireless-service carrier. A group of subscribers is identified, and a level of social-connectedness for each subscriber is determined based on cliques shared by pairs of subscribers and common friends shared by pairs of subscribers. An overall influence score is generated for each subscriber based on the level of social-connectedness. A set of subscribers is identified as having high influence scores; the set of subscribers comprises influencers. Incentives are provided to the set of subscribers.

4 Claims, 8 Drawing Sheets

IDENTIFYING INFLUENCERS USING SOCIAL INFORMATION

SUMMARY

A high-level overview of various aspects of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, ways to identify influencers among a group of subscribers to network services ("subscribers"). An influencer is a subscriber who is likely to influence decisions of other subscribers regarding, for example, whether to cancel or maintain their subscriptions with the network or carrier based on whether the influencer cancels or maintains his or her subscription. Additionally, influencers may influence decisions of other subscribers regarding whether to switch to or adopt a product based on whether the influencer uses the product.

Influencers are identified by determining a level of social-connectedness for each subscriber based on cliques the subscribers belong to and the number of common friends shared by subscribers. An overall influence score is generated for each subscriber based on the subscriber's level of social connectedness—the higher the overall influence score the more likely the subscriber will be identified as an influencer. Once a set of influencers has been identified, incentives may be provided to the influencers. The incentives increase the likelihood that the influencers will maintain their current subscription or adopt a certain product, thus increasing the likelihood that other subscribers who might be influenced will also retain their respective subscriptions or adopt the product.

BRIEF DESCRIPTION OF THE DRAWINGS

Illustrative embodiments of the present invention are described in detail below with reference to the attached drawing figures, and wherein.

DETAILED DESCRIPTION

Figure 1:
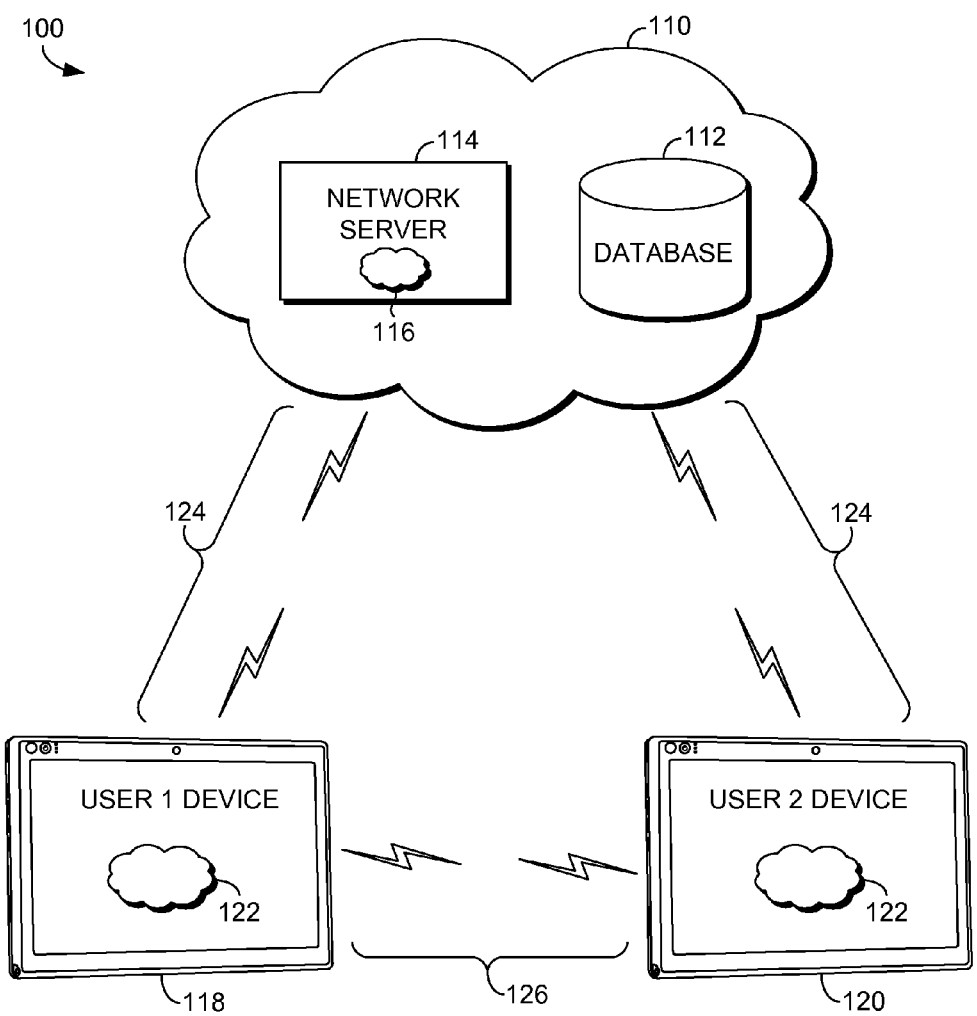
FIG. 1 depicts an illustrative wireless-telecommunications-network environment in accordance with an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for use in using social information to identify influencers amongst a group of subscribers to network services. In one aspect, a first pairwise influence score is generated for a first subscriber by determining the largest-sized clique shared by both the first subscriber and a second subscriber and the number of common friends shared by the first subscriber and the second subscriber. This information is used to generate the first pairwise influence score for the first subscriber.

In a second aspect, a first overall influence score is generated for a first subscriber, and a second overall influence score is generated for a second subscriber using clique information and common friend information. The two overall influence scores are compared to identify the influencer between the first subscriber and the second subscriber. In a third aspect, a level of social-connectedness is determined for each subscriber based on clique information and common friend information. An overall influence score is determined for each subscriber based on the subscriber's level of social connectedness. A set of subscribers having high overall influence scores is identified, and the set is determined to be influencers; incentives may then be provided to the influencers.

Turning now to FIG. 1, an illustrative network environment is depicted according to one embodiment and is referenced generally by the numeral 100. This embodiment comprises a wireless-service network 110 that includes a database 112, a network server 114 and a set of embodied computer-executable instructions 116 that carry out various functional aspects of the invention.

The database 112 may be configured to store information or data about a subscriber including information such as, for example, call data records associated with the subscriber, wireless-service carrier records, and demographic information about the subscriber such as age, income level, household size, and geographical location. Additional information may include subscriber activity on the Internet, subscriber activity associated with applications on a mobile device, short message service (SMS) records, multimedia messaging service (MMS) records, electronic mail (email) records, information concerning the subscriber's use of online social networks, information inputted by the subscriber into a mobile device, and the like. Database 112 may also store similar information or data about other subscribers. One or more of these other subscribers may be friends with or socially connected to the subscriber as determined by a number of different methods that will be discussed in more depth below.

The network server 114 might operate in the wireless-service network 110 using logical connections to one or more remote computers, mobile devices, and the database 112. The network server 114 typically includes, or has access to the computer-executable instructions 116. The network server 114 may communicate with a user 1 device 118 and a user 2 device 120 by way of a wireless-service link 124. The user 1 device 118 and the user 2 device 120 may also communicate with each other through wireless link 126 using, for example, wide area networks (WANs), local area networks (LANs) and near-field communication technology. The user 1 device 118 and the user 2 device 120 may also include a set of embodied computer-executable instructions 122 that carry out various functional aspects of the invention. Although only two devices are shown in FIG. 1, it is contemplated that there can be numerous user devices in communication with each other and with the network 110.

Figure 2:
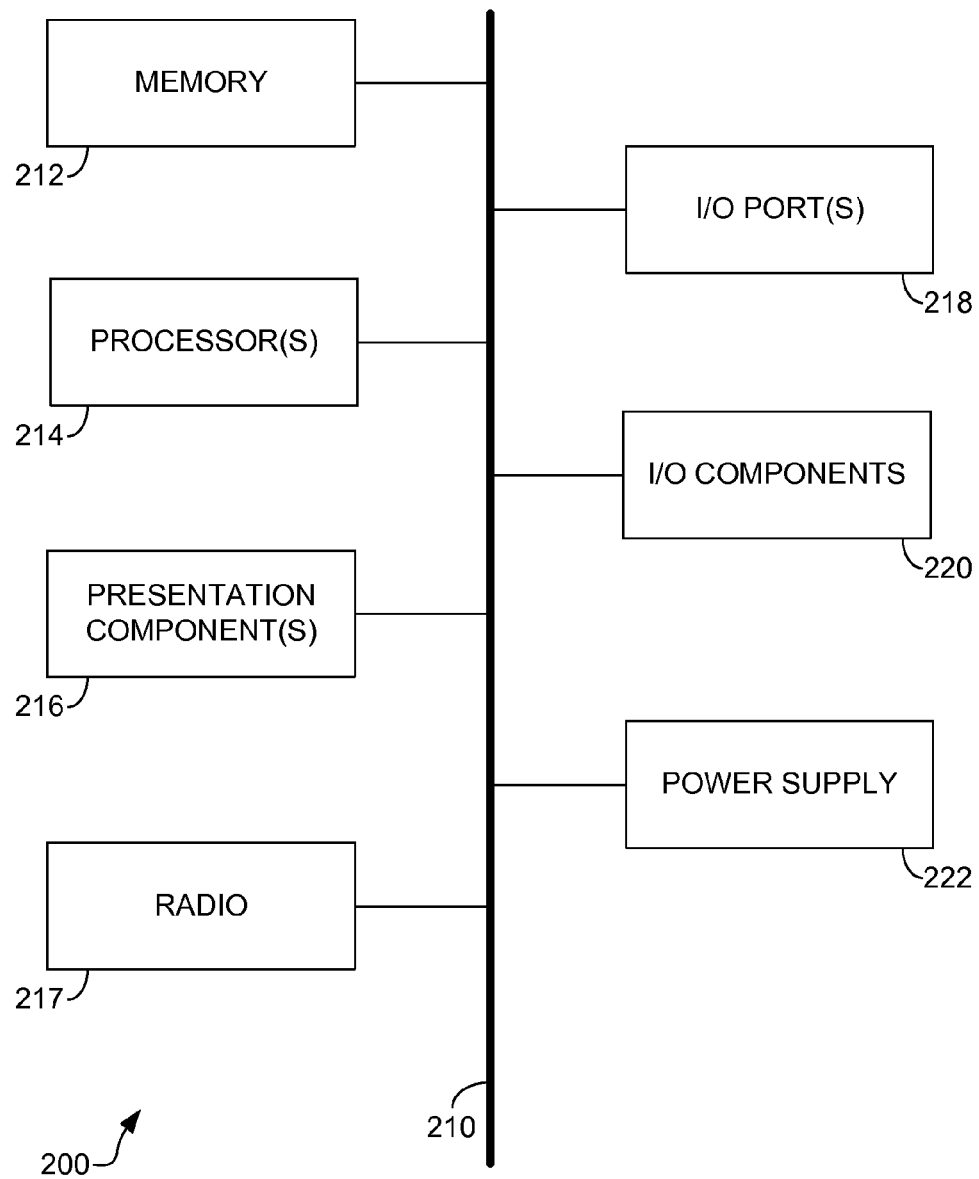
FIG. 2 depicts an illustrative mobile device suitable for practicing an embodiment of the technology.

Turning now to FIG. 2, a block diagram of an illustrative mobile device according to one embodiment is provided and is referenced generally by the numeral 200. The mobile device 200 may be the user 1 device 118 or the user 2 device 120 of FIG. 1. Although some components are shown in the singular, they may be plural. For example, the mobile device 200 might include multiple processors or multiple radios, etc. As illustratively shown, the mobile device 200 includes a bus 210 that directly or indirectly couples various components together including memory 212, a processor 214, a presentation component 216, a radio 217, input/output ports 218, input/output components 220, and a power supply 222.

The memory 212 might take the form of memory components previously described. Thus, further elaboration will not be provided here, only to say that the memory component 212 can include any type of medium that is capable of storing information (e.g., a database). A database can be any collection of records. In one embodiment, the memory 212 includes a set of embodied computer-executable instructions that, when executed, facilitates various aspects disclosed herein. These embodied instructions will variously be referred to as "instructions" or an "application" for short.

The processor 214 might actually be multiple processors that receive instructions and process them accordingly. The presentation component 216 includes the likes of a display, a speaker, as well as other components that can present information (such as a lamp (LED), or even lighted keyboards).

The radio 217 facilitates communication with a wireless-telecommunications-network. Illustrative wireless-telecommunications technologies include CDMA, GPRS, TDMA, GSM, and the like (including what is known in the art as Wimax® technology and also Long Term Evolution (LTE)). In some embodiments, the radio 217 might also facilitate other types of wireless communications including Wi-Fi®, Bluetooth® communications, GIS communications, and other near-field communications.

The input/output port 218 might take on a variety of forms. Illustrative input/output ports include a USB jack, stereo jack, infrared port, proprietary communications ports, and the like. The input/output components 220 include items such as keyboards, microphones, speakers, touch screens, and any other item usable to directly or indirectly input data into the mobile device 200. The power supply 222 includes items such as batteries, fuel cells, or any other component that can act as a power source to power the mobile device 200.

Figure 3:
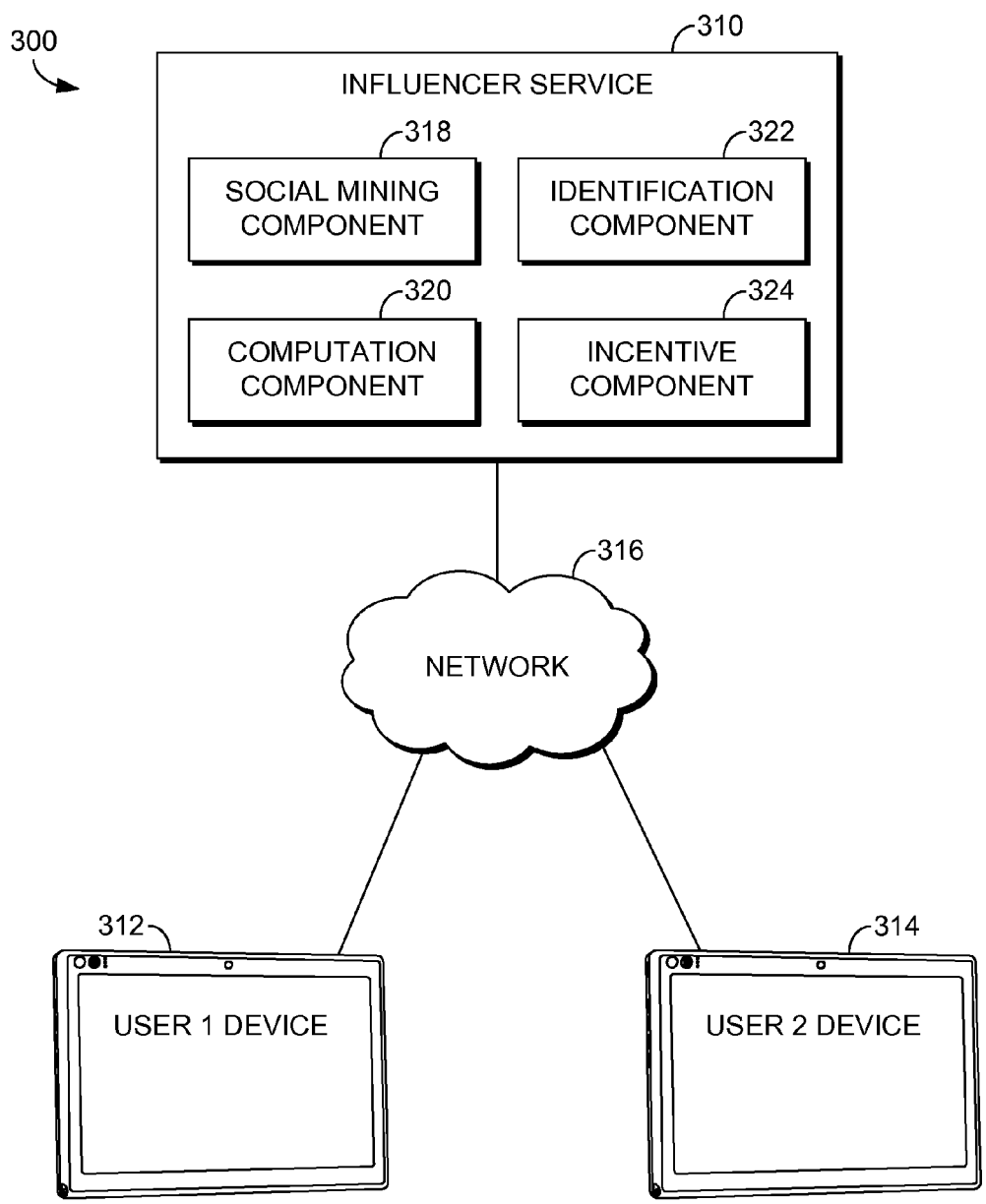
FIG. 3 depicts a block diagram of an exemplary system suitable for using social information to identify influencers among a group of wireless-service subscribers according to an embodiment of the technology.

Turning now to FIG. 3, a block diagram of an exemplary system suitable for identifying influencers amongst a group of subscribers using social information is depicted and is referenced generally by the numeral 300. It will be understood that the exemplary system 300 shown in FIG. 3 is merely an example of one suitable computing system environment for use with embodiments of the present invention. Neither should the exemplary system 300 be interpreted as having any dependency or requirement related to any single module/component or combination of modules/components illustrated therein. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The exemplary system 300 includes an influencer service 310, a user 1 device 312, and a user 2 device 314 all in communication with one another via a network 316. The network 316 may include, without limitation, one or more LANs and/or wide area networks WANs. Such networking environments are commonplace in offices, enterprise-wide computer networks, intranets, and the Internet. Accordingly, the network 316 is not further described herein. The user 1 device 312 and the user 2 device 314 may be the user 1 device 118 and the user 2 device 120 of FIG. 1, and, as such, will not be further described herein except to note that although only two user devices are depicted, multiple user devices are contemplated. The influencer service 310 may carry out the computer-executable instructions 116 or 122 of FIG. 1. As well, the influencer service 310 may reside on a network server (the network server 114 of FIG. 1).

The influencer service 310 may work with any type of computing device such as, for example, the user 1 device 312, the user 2 device 314, or the network server 114 described with reference to FIG. 1. While the influencer service 310 is illustrated as a single unit, it will be appreciated that the influencer service 310 is scalable. For example, the influencer service 310 may in actuality include a plurality of computing devices in communication with one another. The single unit depictions are meant for clarity, not to limit the scope of embodiments in any form.

As shown in FIG. 3, the influencer service 310 comprises a social mining component 318, a computation component 320, an identification component 322, and an incentive component 324. In some embodiments, one or more of the components 318, 320, 322, and 324 may be implemented as stand-alone applications. In other embodiments, one or more of the components 318, 320, 322, and 324 may be integrated directly into the operating system of a computing device such as the user 1 device 312, the user 2 device 314, or the network server 114 of FIG. 1.

In addition, one or more of the components 318, 320, 322, and 324 may be integrated directly into the database 112 of FIG. 1. The components 318, 320, 322, and 324 illustrated in FIG. 3 are exemplary in nature and in number and should not be construed as limiting. Any number of components may be employed to achieve the desired functionality within the scope of embodiments hereof.

As a preface to the more detailed description below regarding the components of the influencer service 310, general information is provided regarding some of the premises on which the invention is based. In this day of social-connectedness, a person is connected to many other people both in an online setting and in an offline setting. Online connectedness can be seen in online social networks such as Facebook® and Twitter®, online gaming networks, online chat rooms, online interest groups, and the like. Offline connectedness occurs in traditional ways such as people calling each other, emailing each other, texting each other, meeting at various clubs or venues, meeting in a workplace environment, or meeting in a family environment. As used throughout this specification, the term "social-connectedness" encompasses both online social-connectedness and offline social-connectedness.

It is often the case that amongst a group of people who are socially connected to each other, one or more of the people emerges as influencers; influencers generally are the social hub of the group and exhibit a high degree of social-connectedness. In simplistic terms, an influencer is a person who influences the decisions of others. In one aspect of this invention, the influencer may be a subscriber to wireless-services provided by a wireless-service carrier or network (such as the network 110 of FIG. 1). In other aspects of the invention, the influencer may be a subscriber who utilizes a landline or an Internet service offered by a network or carrier. The influencer may influence decisions of other subscribers regarding whether to maintain or cancel their current subscription with the carrier based on whether the influencer cancels or maintains his or her subscription (a concept known as "churning"). As well, the influencer may influence decisions of other subscribers regarding product selection. For instance, the influencer may be using a certain mobile device. Based on the influencer's opinion of the mobile device, other subscribers may decide to adopt the mobile device or switch to another device. This holds true with other products such as applications, service plans, and the like.

Turning back to FIG. 3, the social mining component 318 is configured to mine different types of social information to determine if a social connection exists between two or more subscribers. The social mining component 318 may utilize, for example, a graph-mining algorithm to identify and extract needed information. As used throughout this disclosure, a "subscriber" comprises any person who subscribes to a network or carrier, including a wireless-service network. A group of subscribers may subscribe to the same carrier or to different carriers. The social mining component 318 mines social information in a variety of ways.

The social mining component 318 may leverage information that already exists within a network (such as the network 110 of FIG. 1), as well as information that is independent of the network. For example, the social mining component 318 may access a subscriber's call data records stored in a database, such as the database 112 of FIG. 1. The call data records may provide an indication of whom the subscriber is communicating with, how often the subscriber communicates with certain people, and the duration of calls. The social mining component 318 may also access the subscriber's messaging records (SMS, MMS and email). Like above, the messaging records may give an indication of whom the subscriber is messaging and how often the subscriber is messaging a certain person.

The social mining component 318 may also access information concerning whom a subscriber interacts with from Internet use records. Again, this information may be stored in a database such as the database 112 of FIG. 1. The information may include general Internet usage patterns of the subscriber as well as the types of online social networks the subscriber is involved with, how actively the subscriber is involved with these networks, and types of subscriber activity on these networks. Social interactions via online social networks may include such things as "likes," "shares," "ratings," "comments," "postings," tweets, etc. Additionally, the social mining component 318 may mine records associated with the carrier to determine, for example, if a subscriber has indicated who the subscriber's "top" friends are (this information may be used by the carrier as part of a service plan that offers reduced pricing for calls or messages exchanged between the "top" friends). In addition, information may be gathered concerning whether the subscriber is involved in online gaming networks and, if so, who the subscriber plays online games with, how often the subscriber plays with a certain player, and the duration of game play with a certain person.

The social mining component 318 may also access information about the subscriber's social interactions via applications on the subscriber's mobile device. For example, there may be an application that allows the subscriber to recommend services, Web pages, URLs and the like to the subscriber's friends. Information may be gathered concerning to whom the subscriber is making recommendations, as well as how often recommendations are made to any one person. The social mining component 318 can also access images captured from publicly-placed cameras. Thus, a camera could capture an image of the subscriber entering a coffee store with a friend. The social mining component 318 utilizes the information gathered from some or all of these sources to generate a list of people who interact socially with the subscriber.

In one aspect, the social mining component 318 is configured to apply a set of rules to the gathered information in order to identify if a social connection exists. By way of illustrative example only, a social interaction between the subscriber and a person may be found if there is a single interaction between the subscriber and the person. For example, a single phone call between the subscriber and the friend may constitute a social interaction or connection. In another aspect, a social interaction between the subscriber and a friend may be identified if the friend interacts with the subscriber beyond a minimum predetermined threshold level.

The computation component 320 is configured to use the mined social interaction data to determine the largest-sized clique to which a pair of subscribers, for example, subscribers A and B, both belong. The computation component 320 assigns a score based on the size of the clique to which both subscribers A and B belong. This process will be explained in greater depth below. A clique is a complete social community in which all members of the clique have some level of social interaction with each of the other members of the clique. If a subscriber belongs to a larger-sized clique, the subscriber exhibits a higher degree of social-connectedness and is more likely to be an influencer.

Figure 4:
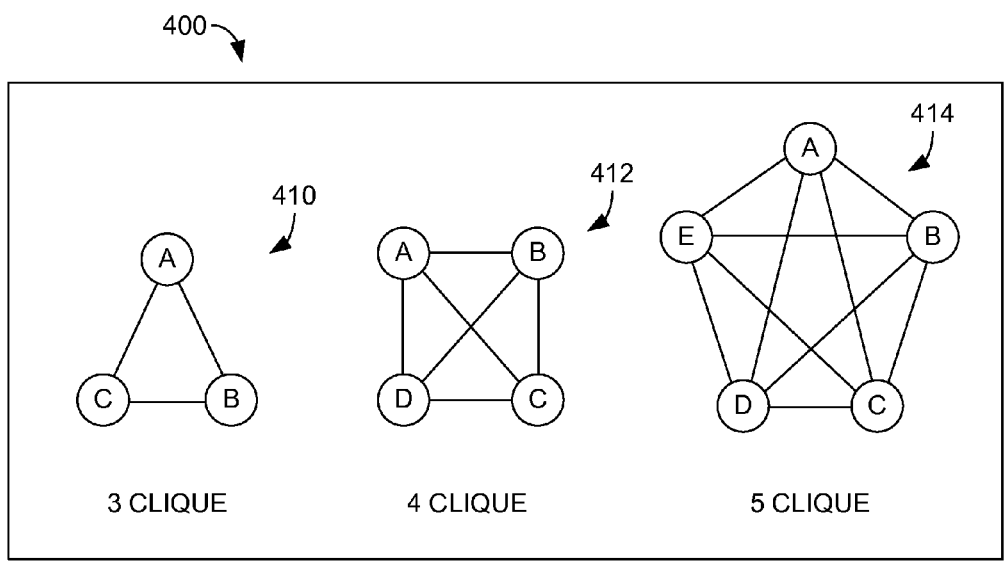
FIG. 4 depicts several exemplary cliques in accordance with an embodiment of the technology.

FIG. 4 illustrates some exemplary cliques and is referenced generally by the numeral 400. Clique 410 is a three-person clique comprised of subscribers A, B, and C. Clique 410 may also be viewed as subscribers A and B sharing a common friend, C. Clique 412 is a four-person clique comprised of subscribers A, B, C, and D. Each of the subscribers has some degree of social interaction with each of the remaining subscribers that are part of the clique 412. The level of social interaction may vary between the different members of the clique 412. For instance, subscribers A and B may have a high amount of social interactions, subscribers A and D may have minimal social interactions, and subscribers B and D may have a moderate amount of social interaction. The clique 412 would be assigned a score of 4, as the clique 412 is comprised of four subscribers. For purposes of this invention, the largest-sized clique to which a pair of subscribers both belong is at least a four-person clique as opposed to a three-person clique. As mentioned above, a three-person clique can alternatively be viewed as a pair of subscribers sharing a common friend.

Continuing with FIG. 4, clique 414 illustrates a five-person clique composed of five subscribers (A, B, C, D, and E). Again, all five subscribers have some level of social interaction with each of the members of the clique 414. The clique 414 would be assigned a score of 5, as the clique 414 is comprised of five subscribers. Although not illustrated, larger-sized cliques are contemplated as being within the scope of the invention.

Figure 5:
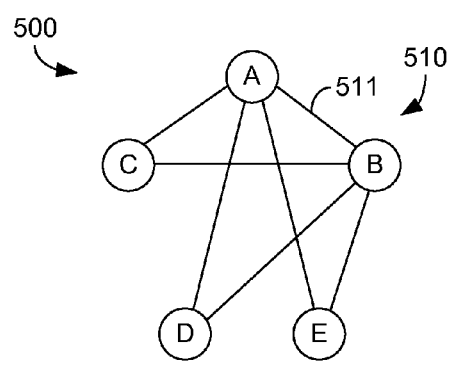
FIG. 5 depicts an exemplary diagram illustrating common friends shared by a pair of users in accordance with an embodiment of the technology.

Turning back to FIG. 3, the computation component 320 is further configured to use the mined social interaction data to determine the number of common friends shared by a pair of subscribers, for example subscribers A and B. FIG. 5 illustrates this aspect of the invention and is referenced generally by the numeral 500. As can be seen in diagram 510, subscribers A and B have social interactions with each other (shown by line 511 connecting the A node and the B node). Subscriber C has social interactions with both A and B; subscriber D has social interaction with both A and B; and subscriber E has social interactions with both A and B. Thus, the number of common friends shared by A and B is three. The diagram 510 also illustrates that subscribers C, D, and E have no social interactions with each other. Like above with respect to the cliques, the level of social interaction may vary between the different subscribers. For instance, although subscriber C is a common friend of both A and B, subscriber C may have a higher level of social interaction with B as compared to A. The computation component 320 assigns a score based on the number of friends shared (e.g., if subscribers A and B share three common friends, the computation component 320 would assign a score of 3).

In one aspect, subscribers A and B may both belong to a clique with a first set of subscribers and have common friends composed of a second set of subscribers; the size of the clique and the number of common friends may both be scored. Alternatively, subscribers A and B may both belong to a clique with a first set of subscribers but not share any common friends. In this case, the size of the clique would be scored and the number of common friend would be set to zero. As well, subscribers A and B may not both belong to any large-sized cliques but may share a number of common friends; the size of the clique would be set to zero, and the number of common friends would be scored. In yet another example, subscriber A may have social connections with other subscribers but not share any cliques or common friends with those subscribers; A's social connections may still be scored as outlined further below. Any and all such aspects are within the scope of the invention.

The computation component 320 is further configured to generate an overall influence score for each subscriber. Using an exemplary subscriber group composed of subscribers A, B, C and D, the overall influence score for subscriber A is generated by summing or taking a linear combination of pairwise influence scores for the subscriber A paired with subscriber B, subscriber A paired with subscriber C, and subscriber A paired with subscriber D. For instance, a pairwise influence score for subscriber A paired with subscriber B may be expressed as:

$$\text{Influence Score}_{A,B} = a_0 C_{A,B} + a_1 F_{A,B} + a_2$$

where $C_{A,B}$ represents the size of the largest common clique shared by subscribers A and B, and $F_{A,B}$ represents the number of common friends shared by A and B. As well, $a_0$ is an optional weight for the clique, $a_1$ is an optional weight for common friends, and $a_2$ is a constant. The constant $a_2$ may be used in cases where subscriber A has social interactions with other subscribers but does not share cliques or common friends with those subscribers. For instance, A talks to B and C, but A does not share any cliques or common friends with B or C. If $a_2$ is set to a value of 1, then the pairwise influence score$_{A,B}$ is 1, and the pairwise influence score$_{A,C}$ is also 1. Thus, the overall influence score for A is 2. However, if A talks to B only, the overall influence score for A is 1.

An overall influence score may be determined for A according to the following formula:

$$\text{Overall Influence Score}_A = a_{A,B} \text{Influence Score}_{A,B} + a_{A,C} \text{Influence Score}_{A,C} + a_{A,D} \text{Influence Score}_{A,D} + a_{A,A}$$

where $a_{A,B}$, $a_{A,C}$, and $a_{A,D}$ represent optional weights; the optional weights may be the same for all pairs, or they may be different. The process described above may be used to generate overall influence scores for subscribers B, C, and D. Although only four subscribers are used in this example, additional subscribers beyond four subscribers are contemplated.

The weights, $a_{A,B}$, $a_{A,C}$, and $a_{A,D}$ may reflect pairwise metrics between the two subscribers such as the number of contacts (calls, SMS messages, emails, etc.), length of contacts (minutes talked), and/or similarity in demographic attributes. The weights may be set as linear functions of the metrics (e.g., more calls, larger weights) or as a step function (e.g., 1 for number of calls greater than or equal to 50, otherwise 0). Demographic attributes may include age, household size, income level, years of education, geographical region, location, etc. The weights may be set to zero to ignore social connectedness. For instance, to limit the complexity of computation, the weights may be set only for a defined number of contacts for each subscriber. By way of example, a subscriber A has fifty contacts, $X_0$ through $X_{49}$. The weights $a_{A,X0}$, $a_{A,X1}$, through $a_{A,X9}$ are set to 1 (or some other value reflecting pairwise metrics) while the rest are set to zero so that only the top 10 most important contacts are considered for evaluating influence. The result is that, at most, 10 pairwise influence scores (measuring social-connectedness) are evaluated per subscriber. To differentiate the important contacts from non-important contacts, the contacts may be ordered based on intensity of communications (measured by, for example, number of communications, talk time, etc.). The weight $a_{A,A}$ is set according to demographic attributes specific to the subscriber for whom the influence score is being determined (subscriber A in this case). It may be set to zero if such information is not considered. Any and all such aspects are within the scope of the invention.

Figure 9:
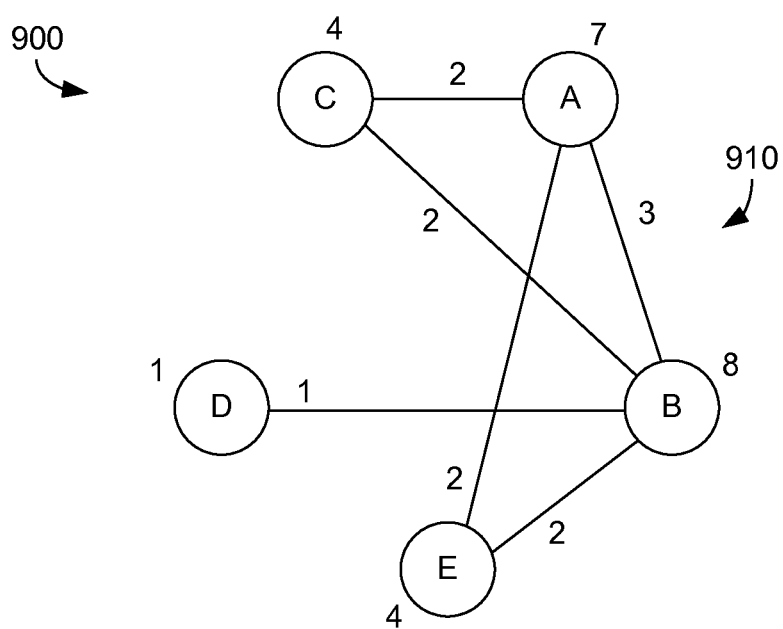
FIG. 9 depicts an example illustrating how an influencer is identified amongst a group of wireless-service subscribers in accordance with an embodiment of the technology.

Turning to FIG. 9, an example is provided to better illustrate aspects of the claimed invention. Diagram 910 comprises five nodes associated with subscribers, A, B, C, D, and E. The five subscribers may have been selected because some degree of social interaction has been determined to exist between the five subscribers. As well, the five subscribers may represent a subset of a larger group of subscribers who are socially connected. The subset may be selected based on, for example, demographic attributes generally shared by the five subscribers.

As can be seen from the diagram 910, the different subscribers have varying levels of social-connectedness. For example, A and C share 1 common friend (B); A and B share 2 common friends (C, E); B and C have 1 common friend (A); B and E have 1 common friend (A); A and E share 1 common friend (B); and B and D have no common friends. Using the formula set forth above for pairwise influence scores and setting the weights equal to 1, multiple pairwise influence scores for the different pairs are determined. For instance, a pairwise influence score of 2 for the pair AC is determined by the following expression:

$$\text{Influence Score}_{A,C} = (1)(0) + (1)(1) + 1$$

$C_{A,C}$ is zero because A and C do not both belong to a clique. In diagram 910, the pairwise influence scores for the different pairs are shown along the lines that connect the different pairs. After the pairwise influence scores have been determined, an overall influence score for each subscriber is generated. Using subscriber A as an example and noting that pairwise influence scores for subscriber A include the values of 2, 3, and 2, an overall influence score for A is generated by summing the pairwise influence scores (2+3+2=7). The overall influence score for each subscriber is shown adjacent to the subscriber nodes. As seen, subscriber B has the highest influence score of 8. This information may be used by an influencer service such as the influencer service 310 of FIG. 3 to determine if subscriber B is considered an influencer.

Although a pairwise approach to determining influence scores is set forth above, the computation component 320 is also configured to determine influence scores in other ways. For instance, the computation component 320 may determine the number of cliques to which a single subscriber (subscriber A) belongs and determine how many subscribers who are socially connected to A belong to these same cliques. An influence score could then be determined based on this information. Additionally, instead of using a pairwise approach, the computation component could determine the number of connected trios of subscribers (A, B, and C) each subscriber is in, the largest-sized clique shared by each such trio, and the number of common friends shared by the trio. Any and all such aspects are within the scope of the invention.

Turning back to FIG. 3, the influencer service 310 further comprises the identification component 322. The identification component 322 is configured to identify influencers based on overall influence scores associated with subscribers. The identification component 322 may rank subscribers by their respective overall influence scores and identify the top 10% as being influencers. In another aspect, the top 20% may be identified as influencers. In yet another aspect, subscribers having overall influence scores above a predetermined threshold may be identified as influencers. Any and all such aspects are within the scope of the invention.

The incentive component 324 is configured to generate and present one or more incentives to subscribers identified as influencers by the identification component 322. Incentives may be in the form of free services, discount services, an opportunity to use a new product or application, and the like.

Figure 6:
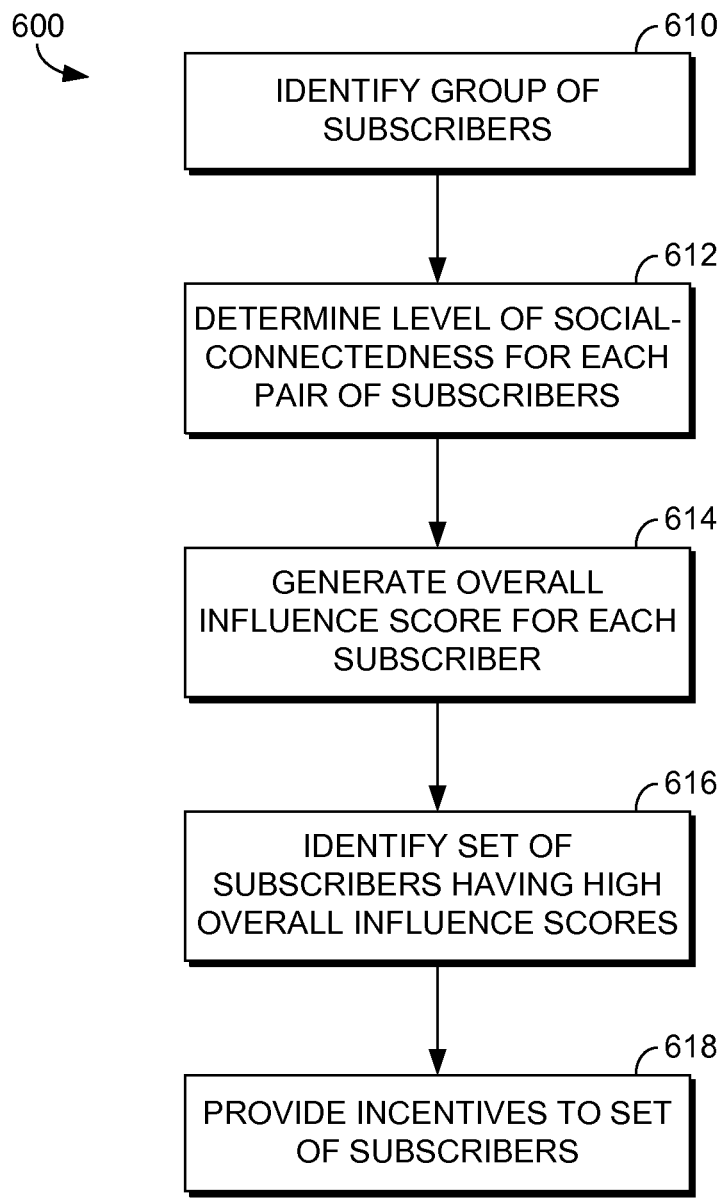
FIG. 6 is a flow diagram showing a method of using social information to identify influencers in accordance with an embodiment of the technology.

Turning now to FIG. 6, a flow diagram is depicted illustrating an exemplary method 600 of using social information to identify wireless-service influencers. At a step 610, a group of subscribers is identified. The group may be comprised of subscribers who all subscribe to the same carrier. As well, the group may comprise subscribers who have some degree of social interaction with each other, or a subset of this group based on similarity of demographic attributes (e.g., the group all resides within a circumscribed geographic area).

At a step 612, a level of social-connectedness is determined for each subscriber in the group. This may be done by accessing social interaction data for the group of subscribers (using, for example, a social mining component such as the social mining component 318 of FIG. 3), and determining a level of social-connectedness for each subscriber using the data. Social-connectedness may comprise cliques shared by pairs of subscribers or common friends shared by pairs of subscribers.

Social-connectedness between different pairs of subscribers may be determined using the following formula:

$$\text{Influence Score}_{A,B} = a_0 C_{A,B} + a_1 F_{A,B} + a_2$$

where A and B comprise a pair of subscribers in the group of subscribers, $C_{A,B}$ is the size of the clique shared by both A and B, and $F_{A,B}$ is the number of common friends shared by A and B. One or more weighted constants ($a_0$, $a_1$, $a_2$, or additional constants) may also be utilized to further modify the pairwise influence score. The constants may include a number of calls between A and B, the number of talk minutes between A and B, the number of messages (SMS, MMS, email) exchanged between A and B, demographic attributes shared between A and B, and the like.

At a step 614, an overall influence score for each subscriber is determined based on the level of social-connectedness. For instance, the overall influence score for A may be determined based on the following formula and assuming subscribers A, B, C, and D comprise the group of subscribers:

$$\text{Overall Influence Score}_A = a_{A,B}\text{Influence Score}_{A,B} + a_{A,C}\text{Influence Score}_{A,C} + a_{A,D}\text{Influence Score}_{A,D} + a_{A,A}$$

The weights, $a_{A,B}$, $a_{A,C}$, $a_{A,D}$, and $a_{A,A}$ are optional. The weights may include the pairwise metrics set forth above (call duration, call frequency, message frequency, similarity in demographic attributes, etc.). The weights may also include demographic attributes specific to the subscriber for whom the influence score is being determined (subscriber A in this case). For example, the constant $a_{A,A}$ may be set to a bigger number if A's age is between 40 and 50 and a smaller number if A's age is above 70.

At a step 616, a set of subscribers is identified as having higher overall influence scores; this set of subscribers is identified as being influencers. For instance, if an overall influence score for a subscriber is above a predetermined threshold, the subscriber may be identified as an influencer. In another aspect, the overall influence scores for the group are ranked and those subscribers having overall influence scores in the top 10-20% are identified as influencers. At a step 618, incentives are provided to the identified influencers. As mentioned above, incentives may include free or discounted wireless services, opportunities to use new products or applications, and the like.

Figure 7:
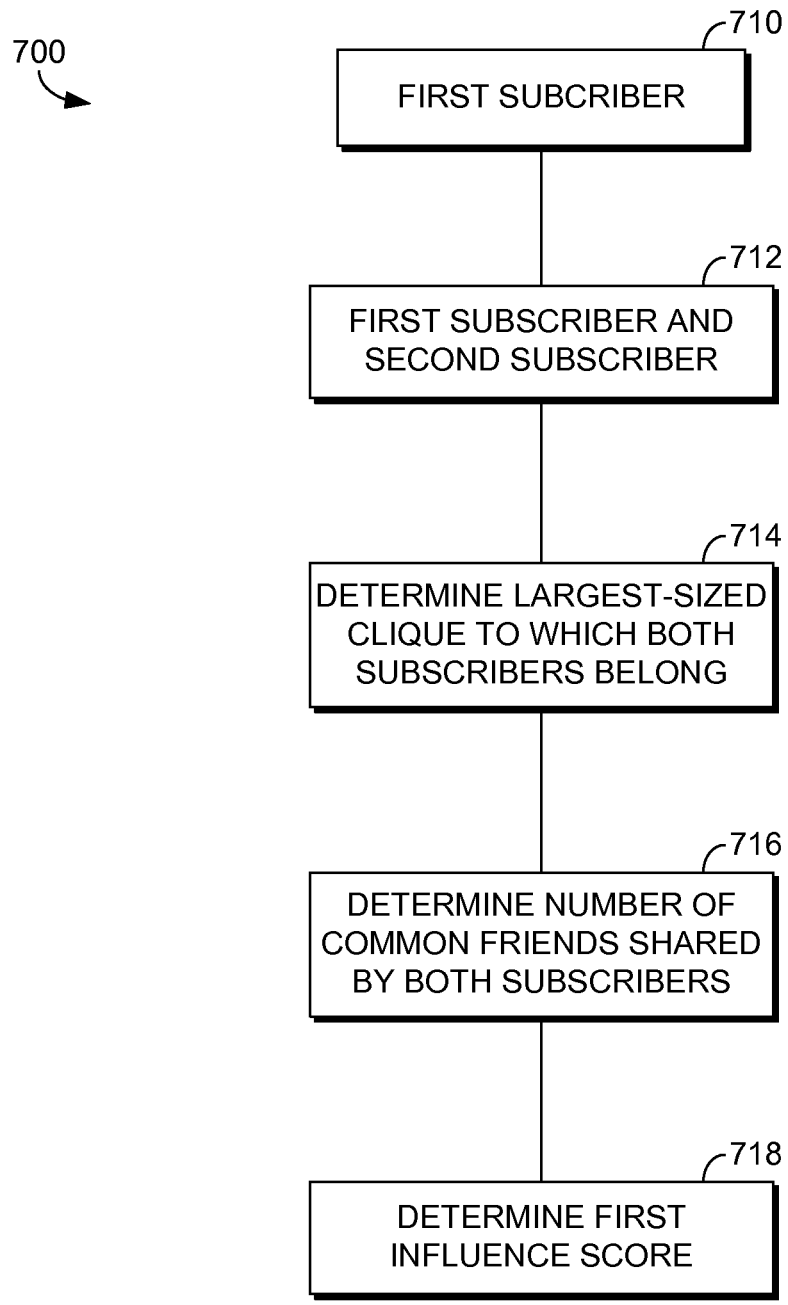
FIG. 7 is a flow diagram showing a method of determining an overall influence score for a subscriber in accordance with an embodiment of the technology.

Turning now to FIG. 7, a flow diagram is depicted illustrating an exemplary method 700 of determining an overall influence score for a first subscriber. At a step 710, the first subscriber is identified; the first subscriber belongs to a group of subscribers who are socially connected. At a step 712, the first subscriber is paired with a second subscriber of the group. At a step 714, the largest-sized clique shared by both the first and second subscribers is determined and scored based on the size of the clique. As mentioned earlier, the largest-sized clique shared by both subscribers is at least a four-person clique.

At a step 716, the number of common friends shared by both the first and second subscribers is determined and scored, and, at a step 718, a first pairwise influence score is determined for the first subscriber and the second subscriber using at least one of the largest-sized clique or the number of common friends.

The process set forth above is repeated when the first subscriber is paired with a third subscriber, a fourth subscriber, and so on until the first subscriber has been paired with all of the members of the group. All of the pairwise influence scores associated with the first subscriber are combined either by simple summing or a linear combination using weights to generate an overall influence score for the first subscriber. The overall influence score for the first subscriber may subsequently be compared to overall influence scores for other subscribers within the group to determine which of the subscribers are influencers.

Figure 8:
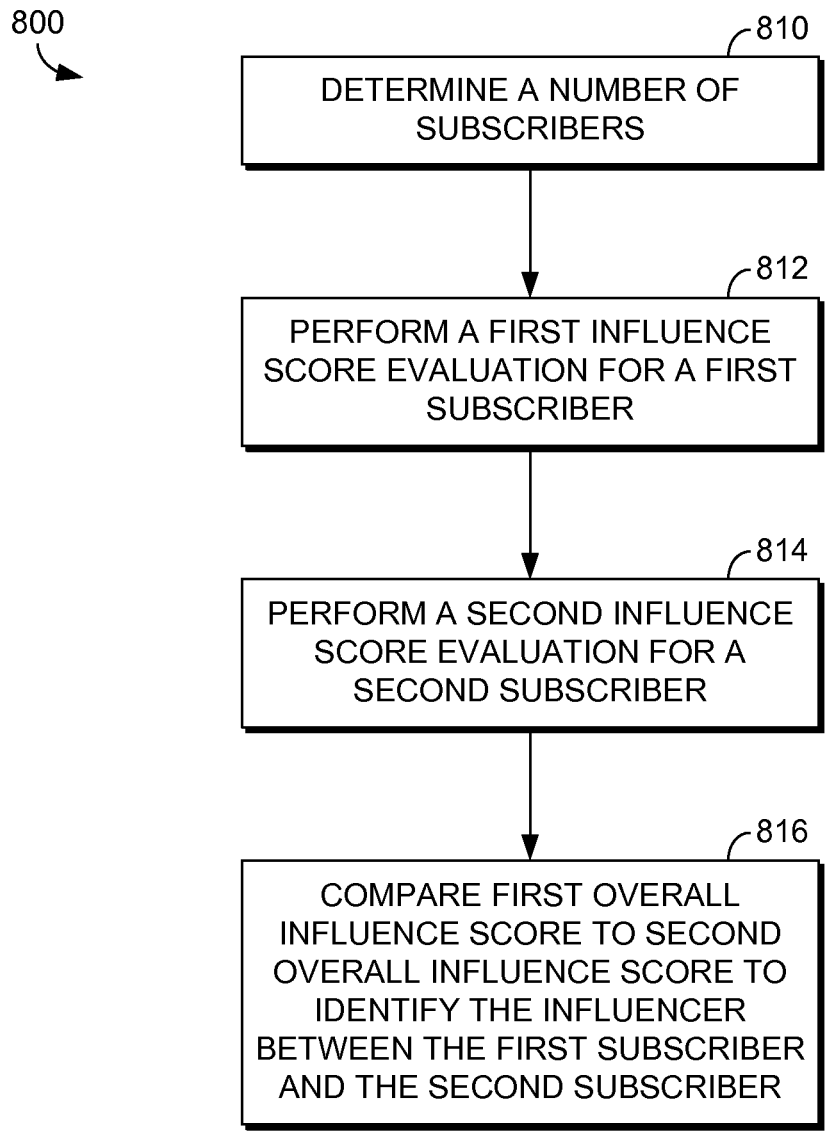
FIG. 8 is a flow diagram showing a method of identifying influencers based on overall influence scores in accordance with an embodiment of the technology.

Turning to FIG. 8, a flow diagram is depicted illustrating an exemplary method 800 of identifying an influencer between a first and second subscriber. At a step 810, a number of subscribers who have some degree of social-connectedness with each other is determined; the number includes at least the first and second subscriber. At a step 812, a first influence score evaluation is performed for the first subscriber. As outlined above, this includes determining the largest-sized clique shared by the first subscriber and each of the remaining subscribers, determining common friends shared by the first subscriber and each of the remaining subscribers, calculating a first set of influence scores for the first subscriber using at least the clique size information or the common friend information, and determining an overall influence score for the first subscriber using the first set of influence scores.

At a step 814, a second influence score evaluation is carried out for the second subscriber, but the second influence score evaluation is not repeated for the second subscriber and the first subscriber. At a step 816, the first overall influence score is compared to the second overall influence score to identify the influencer between the first and second subscriber. The influencer between the pair of subscribers has a higher overall influence score.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, enable a computing device to perform a method of using social information to identify influencers, the method comprising:
   identifying a group of subscribers ("subscribers") subscribing to services offered by a carrier;
   accessing call data records stored in association with a first data store to determine a first level of offline social-connectedness for each subscriber of the group of subscribers;
   accessing Internet use records stored in association with a second data store to determine a second level of online social-connectedness for the each subscriber of the group of subscribers;
   using the first level of offline social-connectedness and the second level of online social-connectedness, determining an overall level of social-connectedness comprising:
      (1) cliques shared by the each subscriber and each of the remaining subscribers of the group of subscribers,
      (2) common friends shared by the each subscriber and the each of the remaining subscribers of the group of subscribers;
   generating an overall influence score for the each subscriber based on the overall level of social connectedness;
   identifying a set of subscribers of the group of subscribers having higher overall influences scores, the set of subscribers comprising influencers; and
   providing incentives to the set of subscribers.

2. The media of claim 1, wherein an influencer is a subscriber who is likely to influence decisions of other subscribers regarding:
   (1) whether to cancel or maintain their subscriptions with the carrier based on whether the influencer cancels or maintains the influencer's subscription, and
   (2) whether to switch to another product based on whether the influencer uses the product.

3. The media of claim 1, wherein the set of subscribers comprises subscribers having overall influence scores in the top 20% of overall influence scores for the group of subscribers.

4. The media of claim 1, wherein the incentives increase a likelihood that the set of subscribers will retain their subscriptions, and thereby increase a likelihood that other subscribers of the group of subscribers will also retain their respective subscriptions.

* * * * *